United States Patent [19]

Ragen

[11] 4,349,770
[45] Sep. 14, 1982

[54] ELECTRONIC DAMPING APPARATUS

[75] Inventor: Robert A. Ragen, Hayward, Calif.

[73] Assignee: Xerox Corporation, Stamford, Conn.

[21] Appl. No.: 171,205

[22] Filed: Jul. 22, 1980

[51] Int. Cl.³ .............................................. G05B 19/40
[52] U.S. Cl. .................................. 318/685; 318/653; 318/594; 318/696
[58] Field of Search ................ 318/696, 685, 594, 653

[56] References Cited

U.S. PATENT DOCUMENTS

| | | |
|---|---|---|
| 3,442,364 | 5/1969 | Ragen . |
| 3,458,786 | 7/1969 | Thompson . |
| 3,463,985 | 8/1969 | Fredriksen . |
| 3,482,155 | 12/1969 | Fredriksen . |
| 3,541,418 | 11/1970 | Agin et al. . |
| 3,573,589 | 4/1971 | Berry . |
| 3,586,953 | 6/1971 | Markhanen et al. . |
| 3,660,746 | 5/1972 | Milek . |
| 3,707,214 | 12/1972 | Ponzano . |
| 3,727,121 | 4/1973 | Rich . |
| 3,760,252 | 9/1973 | Beery . |
| 3,767,993 | 10/1973 | Yablonski . |
| 3,842,331 | 10/1974 | Hendrickson et al. . |
| 3,845,378 | 10/1974 | Hendrickson et al. . |
| 3,868,557 | 2/1975 | Scott, Jr. . |
| 3,940,676 | 2/1976 | Dudley . |
| 3,965,406 | 6/1976 | Yablonski . |
| 3,974,434 | 8/1976 | Yablonski . |
| 3,975,669 | 8/1976 | Tyler . |
| 3,983,468 | 9/1976 | Maitrias . |
| 3,986,094 | 10/1976 | Quioque et al. . |
| 4,019,110 | 4/1977 | Gerry . |
| 4,025,837 | 5/1977 | Meier et al. . |
| 4,030,591 | 6/1977 | Martin et al. . |
| 4,072,888 | 2/1978 | Bechtle et al. . |
| 4,078,485 | 3/1978 | Guthrie . |
| 4,091,316 | 5/1978 | Friedman . |
| 4,129,813 | 12/1978 | Hunts et al. . |

OTHER PUBLICATIONS

Incremental Motion Control Systems and Devices, B. C. Kuo, May, 1978.
Electrical Damping System for a Stepper Motor, R. W. Kulterman, IBM-TDB, vol. 21, No. 2, Jul. 1978.
Stepper Motor Damping, J. M. Rakes et al., IBM-TDB, vol. 22, No. 11, Apr. 1980.

Primary Examiner—B. Dobeck
Attorney, Agent, or Firm—Barry Paul Smith

[57] ABSTRACT

Apparatus is disclosed for controlling the movement of a movable element to bring the movable element to rest at a desired stopping position. The apparatus comprises a multi-phase drive motor having a drive shaft coupled to the movable element for driving same, four electrically conductive coils mounted in position-displaced relationship about the shaft, and means coupled to the drive shaft and responsive to the selective energization of the coils by respective motor drive signals for causing the corresponding rotation of said drive shaft and movement of said movable element. A sensor is coupled to the drive shaft and is responsive to the rotation thereof for generating an electrical signal containing information indicative of the direction, speed and distance of movement of said movable element. Further, means are included for detecting from the distance information indicated by the electrical signal whether the movable element is within a predetermined distance of said desired stopping position. When it is, a controller controls the levels of the motor drive signals in dependence upon the direction information indicated by the electrical signal such that the motor and thus the movable element are brought to a final stop with only a single one of the motor drive signals and thus corresponding single motor coil on. The controller selectively turns on and off or reverses either the two coils displaced counterclockwise of the single motor coil about the shaft or the two coils displaced clockwise of the single motor coil about the shaft in dependence upon the direction information indicated by the electrical signal.

13 Claims, 17 Drawing Figures

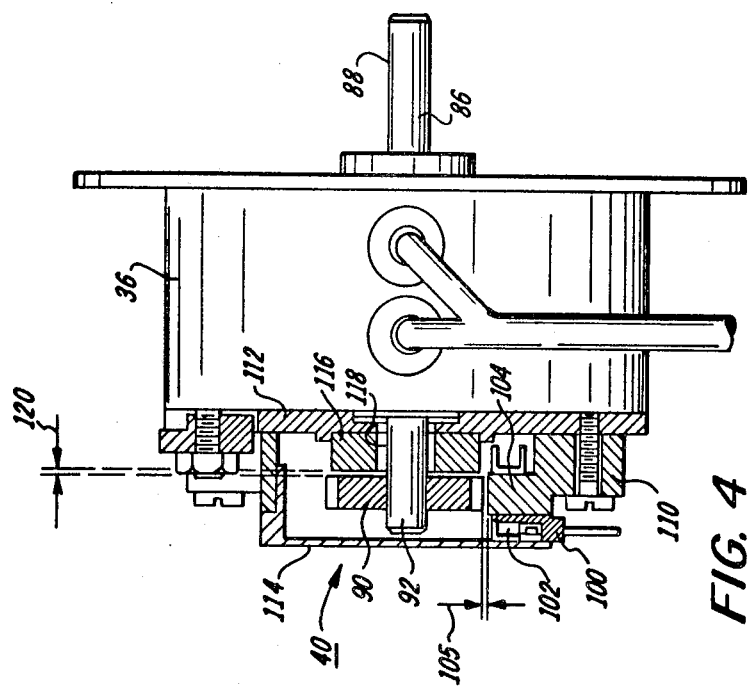
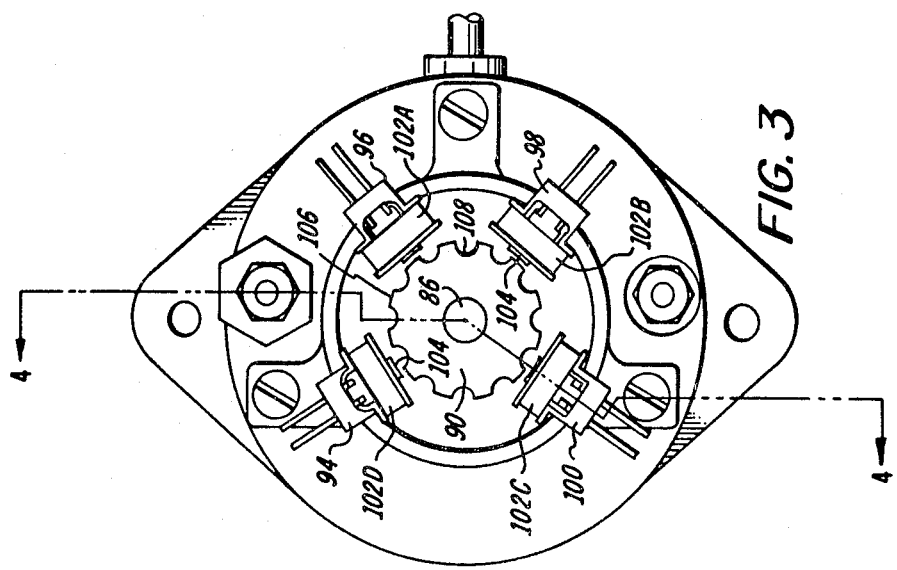

ELECTRONIC DAMPING APPARATUS

BACKGROUND OF THE INVENTION

This invention relates to apparatus for controlling the movement of a movable element to bring the movable element to rest at a desired stopping position. More particularly, this invention relates to damping the final motion of the movable element when brought to rest as its desired stopping position.

Electrical and electronic damping systems for drive motors are well known. One such system utilized in a d-c servo motor control system for a serial impact printer is disclosed in U.S. Patent Nos. 3,954,163 and 4,091,911. As disclosed in those patents, separate d-c servo motors are used to drive the carriage and print wheel of a serial impact printer. Each drive motor has a servo control system associated therewith which is of the so-called "dual-mode" type.

For example, and in the case of the drive motor for the print wheel, when it is desired to rotate the print wheel greater than a predetermined distance, the servo control system first operates in a velocity mode, where a signal indicative of the actual velocity of the print wheel is compared with a signal indicative of the desired velocity of the print wheel for the particular distance remaining to travel. The resultant error signal is supplied to the drive motor for controlling same. When the print wheel has ultimately been rotated to within said predetermined distance, the servo control system switches from the velocity mode to a linear mode, during which the actual velocity signal is compared with a sinusoidal position signal. As is conventional, the actual velocity signal serves to damp the controlled motion of the motor and thus print wheel in both modes of operation.

Other serial impact printers of the print wheel type currently on the market utilize openloop stepper motor control systems, where there is no feedback of position or velocity information and no damping at or near the desired stopping position. These systems require relatively expensive and powerful stepper motors to maintain stability and accuracy of positioning at the required speed levels.

Closed-loop systems including "end-point damping" capabilities have been designed specifically for motors other than d-c servo motors, such as multi-phase stepper motors and the like. When the presence of such closed-loop systems enables the use of cheaper and less powerful stepper motors, the closed-loop systems themselves have proven to be relatively complex and costly.

It would be desirable, therefore, to provide a motion damping apparatus for motors other than d-c servo motors, such as for multi-phase stepper motors, which is not as complex and costly damping apparatus of this type.

SUMMARY OF THE INVENTION

In accordance with one aspect of the invention, apparatus is provided for controlling the movement of a movable element to bring the movable element to rest at a desired stopping position. The apparatus comprises a multi-phase drive motor having a drive shaft coupled to said movable element for driving same, four electrically conductive coils mounted in position-displaced relationship about said shaft, and means coupled to said drive shaft and responsive to the selective energization of said coils by respective motor drive signals for causing the corresponding rotation of said drive shaft and movement of said movable element; a sensor coupled to said drive shaft and responsive to the rotation thereof for generating an electrical signal containing information indicative of the direction, speed and distance of movement of said movable element; means for detecting from the distance information indicated by said electrical signal whether said movable element is within a predetermined distance of said desired stopping position; and control means for controlling the levels of said motor drive signals in dependence upon the direction information indicated by said electrical signal following detection of said movable element being within said predetermined distance of said desired stopping position, said motor and thus said movable element being brought to a final stop with only a single one of said motor drive signals and thus corresponding single motor coil on, said control means including means for selectively turning on and off or reversing either the two coils displaced counterclockwise of said single motor coil about said shaft or the two coils displaced clockwise of said single motor coil about said shaft in dependence upon the direction information indicated by said electrical signal.

In accordance with another aspect of the invention, the motion control apparatus comprises a multi-phase drive motor having a drive shaft coupled to said movable element for driving same, four electrically conductive coils mounted in position displaced relationship about said shaft, and means coupled to said drive shaft and responsive to the selective energization of said coils by respective motor drive signals for causing the corresponding rotation of said drive shaft and movement of said movable element; a sensor coupled to said drive shaft and responsive to the rotation thereof for generating an electrical signal containing information indicative of the direction, speed and distance of movement of said movable elements; means for detecting from the distance information indicated by said electrical signal whether said movable element is within a predetermined distance of said desired stopping position; and control means for controlling the levels of said motor drive signals in dependence upon the direction information indicated by said electrical signal following detection of said movable element being within said predetermined distance of said desired stopping position, said motor and thus said movable element being brought to a final stop with two adjacent motor coils turned on by their respective motor drive signals, said control means including means for selectively turning on and off or reversing one of said two adjacent motor coils and a third motor coil adjacent the other of said two adjacent motor coils.

In accordance with the preferred embodiment, when the movable element is moved at a constant velocity, the electrical signal is periodic with a peak amplitude and frequency proportional to the velocity of the movable element, has a polarity indicative of the direction of movement of the movable element, and has a period representative of a predetermined increment of movement of the movable element.

These and other aspects and advantages of the invention will be described in more detail below with reference to the accompanying drawing figures.

BRIEF DESCRIPTION OF THE DRAWINGS

FIG. 3 is a front elevation view of the print wheel motor and presently preferred print wheel sensor depicted in FIG. 1;

FIG. 4 is a partial cross-sectional view of the print wheel motor and sensor of FIG. 3 taken along line 4—4 FIG. 3;

DESCRIPTION OF THE PREFERRED EMBODIMENT

Figure 1:
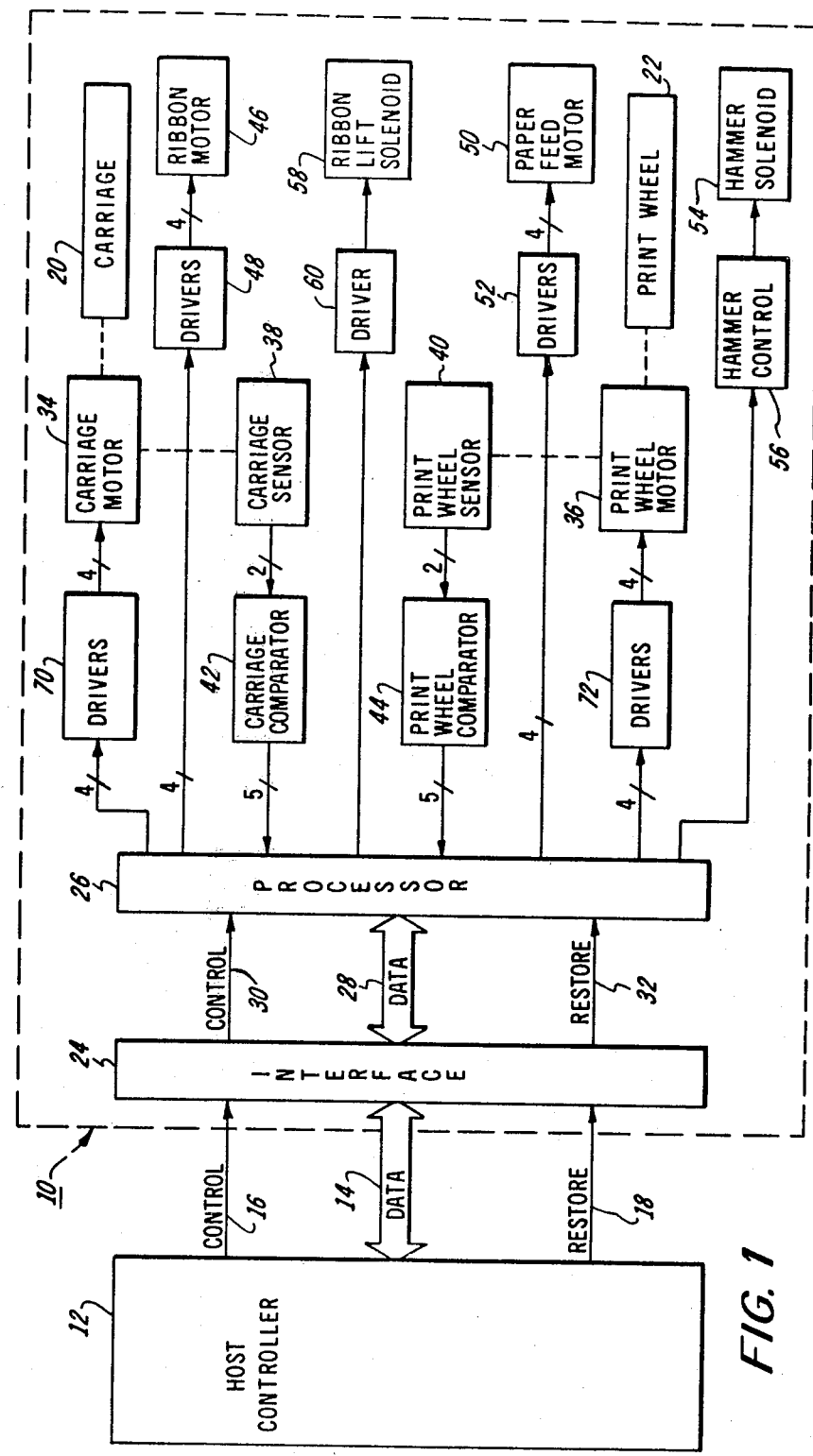
FIG. 1 is a block diagram representation of a printer incorporating the unique features of the present invention.

Referring to FIG. 1, an impact printer 10 is shown incorporating the unique features of the present invention. The printer 10 is depicted as being of the print wheel type, but it will become apparent from the discussion below that the invention is equally applicable to other types of serial printers, as well as to other products and devices, such as disk drives, which require the controlled linear or radial movement of a movable element.

The printer 10 is capable of communicating with a host controller 12 by means of a host data bus 14. As will be discussed in more detail below, the host controller 12 is capable of supplying both command data and character data over the bus 14 to the printer 10, whereas the printer 10 is capable of supplying both character data and status data over the bus 14 to the host controller 12. In addition, the host controller 12 is capable of supplying various control signals to be discussed below over respective control lines 16 to the printer 10, as well as a special control signal, i.e., RESTORE, on a line 18 for the purpose of resetting all electronic circuits and returning various movable mechanical components, such as a carriage 20 and print wheel 22 (shown in block form in FIG. 1) to "home" positions, as is conventional.

The printer 10 includes an interface 24 for receiving, storing and forwarding the various data and signals alluded to above between the host controller 12 and a processor 26 of the printer 10. The processor 26 will be described in more detail below with reference to FIG. 2. The interface 24 communicates with the processor 26 by means of a printer data bus 28, control lines 30 and a RESTORE line 32.

Still referring to FIG. 1, the carriage 20 and print wheel 22 are driven by a carriage motor 34 and a print wheel motor 36, respectively. In accordance with the present invention, the motors 34 and 36 are stepper motors, desirably of the 4-phase, permanent magnet type. In the case of the carriage motor 34, it may be coupled through a conventional cable-pulley or belt arrangement (not shown) to the carriage 20 for driving same along a prescribed linear path, whereas the print wheel 22, which may be of the daisy-wheel type, can be loaded directly or geared onto the drive shaft of the print wheel motor 36 in a known manner.

Mechanically coupled to the carriage motor 34 is a carriage sensor 38 which generates a pair of 90° phase-displaced substantially sinusoidal signals whose amplitude and frequency are proportional to the speed of the motor 34 and which provide an indication of the position, direction and speed of movement of the carriage 20 in a manner to be described below. The print wheel motor 36 has a similar sensor 40 for generating a similar pair of 90° phase-displaced substantially sinusoidal signals A-C and B-D (FIG. 6) which provide an indication of the position, direction and speed of rotation of the print wheel 22.

The pair of phase-displaced sinusoidal output signals from the carriage sensor 38 are applied to a carriage comparator 42 which generates four, 90° phase-displaced squarewave CARRIAGE SENSOR signals, as well as a CARRIAGE VELOCITY signal, for application to the processor 26. The relationship of these latter five signals to the two phase-displaced sinusoidal signals, as well as the manner in which they are processed by the processor 26 will be described in more detail below with reference to FIGS. 5-9. A print wheel comparator 44 substantially identical to the carriage comparator 42 is coupled to the outputs of the print wheel sensor 40 for developing four, 90° phase-displaced square-wave PRINT WHEEL SENSOR signals and a PRINT WHEEL VELOCITY signal.

The processor 26 generates four CARRIAGE MOTOR DRIVE signals for application through respective drivers 70 to the carriage motor 34. Likewise, the processor 26 generates four PRINT WHEEL DRIVE signals for application through respective drivers 72 to the print wheel motor 36. All of the drivers depicted in FIG. 1 are conventional and will not be described in detail herein.

The printer 10 also includes a ribbon motor 46 for advancing a supply of ribbon (not shown), typically contained in a ribbon cartridge (not shown) mountable to the carriage 20 linearly movable past a printing station. The ribbon motor 46 is preferably a 4-phase stepper motor driven by four drive signals from the processor 26, as supplied through conventional driver circuits 48. Similarly, the printer 10 includes a paper feed motor 50, also preferably a 4-phase stepper motor, driven by four drive signals from the processor 26, as supplied through additional conventional driver circuits 52.

As shown in FIG. 1, the printer 10 further includes a hammer solenoid 54 for controlling the impact of a hammer element (not shown) mounted to the carriage 20 in alignment with a print position adjacent the print wheel 22, as is conventional. When the solenoid 54 is energized, a selected character element on the print wheel 22 is impacted by the hammer element against an adjacent platen (not shown), as is also conventional. A HAMMER FIRE signal to energize the solenoid 54 is generated by the processor 26 and supplied to the solenoid 54 through a conventional hammer control circuit 56. Lastly, the printer 10 includes a ribbon lift solenoid 58 for controlling the selective lifting of ribbon in a vertical direction, such as in the case of multi-colored ribbon. A RIBBON LIFT signal from the processor 26 is supplied through a conventional driver 60 to selectively energize the solenoid 58.

Before describing details of the processor 26, it would be helpful to review the nature and character of the control and data signals communicated between the host controller 12 and the printer 10. Insofar as the data transmitted over the busses 14 and 28, it preferably consists of 16-bit words transmitted as two, 8-bit words in series. The four high-order bits of the 16-bit word contain command information and the twelve lower-order bits contain operational information, such as information relating to the desired positions of the carriage 20, print wheel 22, paper or ribbon, in the case of data applied to the printer 10, or information relating to the actual positions of the carriage 20, print wheel 22, paper or ribbon, as well as other status information, in the case of data applied by the printer 10 to the host controller 12.

With respect to incoming data relating to print wheel position, the high-order four bits would contain a PRINT WHEEL command, signifying that the succeeding twelve bits relate to the position of the print wheel 22. Actually, only the seven lowest-order bits of the twelve-bit field would represent "desired position" information for the print wheel 22. This information is preferably in the form of a unique 7-bit ASCII code indicating a particular character element on the print wheel 22. The processor 26 converts this code into an 8-bit word signifying the position of that character element on the print wheel 22 relative to a predetermined reference or "home" location, as is conventional.

With respect to incoming data relating to carriage position, the host controller 12 monitors the actual position of the carriage 20, such information being fedback by the printer 10 on the data busses 28 and 14. The host controller 12 will then issue a CARRIAGE command in the high-order four bits of the 16-bit data field, followed by the lower-order twelve bits identifying the direction (by the fifth-highest order bit) and amount of carriage motion required (by the remaining sixth through sixteenth bits). The carriage 20 may be moved in increments of 1/120 inch, as is conventional.

Typical status information forwarded on the data busses 28 and 14 from the printer 10 to the host controller 12 include such signals as PAPER OUT and RIBBON OUT, as well as various diagnostic data. These are sent one at a time in the lowest 12-bits of a particular 16-bit data field, the highest 4-bits signifying the type of status information to be forthcoming.

The four control lines 30 from the interface 24 supply the printer 10 with information relating to the state of the various input and output registers (not shown) in the interface 24, as well as DATA STROBE signals for clocking the data transfer along the bus 28. The DATA STROBE signals are additionally applied along control lines 16 for clocking the transfer of data along the data bus 14 between the interface 24 and the host controller 12.

The presently preferred processor 26 will now be described with reference to FIG. 2. As shown, the processor 26 includes a master processor 62, a slave processor 64 andan I/O expander 66. The master processor 64 is preferably a multi-function integrated circuit (IC) chip comprised of an 8-bit microprocessor section, a random-access-memory (RAM) section capable of storing 64, 8 bit-words, and a read-only-memory (ROM) section capable of storing 1,024, 8-bit words. The master processor chip 62 also includes all necessary internal busses and control lines necessary to transfer data between and among the microprocessor, RAM and ROM sections thereof. A presently preferred IC chip having the characteristics of the master processor 62 as just described is the Intel 8048 microcomputer chip manufactured by Intel Corporation of Santa Clara, California.

The master processor 62 is primarily responsible for generating the four CARRIAGE MOTOR DRIVE signals to drive the carriage motor 34 and the RIBBON LIFT signal to control the ribbon lift solenoid 58. Additionally, the master processor 62 issues control signals on control lines 68 for controlling the operation of the slave processor 64. In this respect, the control lines 68 are coupled between control output terminals of the master processor 62 and control input terminals of the slave processor 64.

The master processor 62 initially receives all command and operational data from the interface 24 along the data bus 28, and either stores it in a location in its RAM, such as when the data relates to the carriage 20, or directs it back along the data bus 28 to the slave processor 64 for processing and/or storage therein. The master processor 62 also receives the DATA STROBE and interface register status signals from the interface 24 on lines 30, as well as the RESTORE signal from the interface on line 32. Finally, the master processor 62 receives the five output signals from the carriage comparator 42, i.e., the four, 90° phase-displaced CARRIAGE SENSOR signals and the CARRIAGE VELOCITY signal.

In the case of controlling the motion of the carriage 20, and as previously indicated, a signal representing the distance to travel by the carriage 20 from its current stopped position to a newly desired stopped position will be transmitted along the busses 14 and 28 as the lowest 11 bits of a 16-bit field. The next highest, 12th bit, signifies the desired direction of movement of the carriage 20, and the highest-order four bits identify the character of the lowest 12 bits, i.e., CARRIAGE command. The master processor 62 loads the 11-bit distance to travel data into appropriate RAM locations. This data is then periodically accessed and used as address signals for the ROM internal to the master processor 62 in order to generate command velocity data in a manner to be described in more detail below with reference to FIGS. 10 and 11.

The command velocity data generated by the master processor's internal ROM is compared with data representative of the actual velocity of the carriage 20. This latter data is derived by the master processor 62 by running a counter between steps of the carriage motor 34, as detected by the processor 62 through analysis of the four, 90° CARRIAGE SENSOR signals in a manner to be described in more detail below. The actual velocity data is normally stored at a predetermined RAM location internal to the processor 62 and is accessed when a comparison of such data to the command velocity data is to be made. During such comparison, the processor 62 computes the difference between the actual and command velocity data and generates the four CARRIAGE MOTOR DRIVE signals representative of the results of such computation, i.e., a velocity error signal, in order to drive the carriage motor 34 in the appropriate direction and speed so as to tend to match the original command velocity. It should be noted that the command velocity data actually stored in RAM represents a desired count or time between adjacent steps of the carriage motor. This desired count is compared with the count representative of the actual velocity of the carriage 20.

New updated values of carriage command velocity are generated by the processor 62 as the carriage 20 is moved toward the newly desired stopping position, i.e., the distance to travel data originally supplied by the host controller 12 and loaded into a RAM location in the processor 62 is continuously reduced in value toward zero. The master processor 62 is able to monitor movement of the carriage 20 and periodically reduce the value of the distance to travel data stored in the processor's internal RAM through the four CARRIAGE SENSOR signals generated by the carriage sensor 38. Basically, the processor 62 detects alternate "zero-crossings" of each of the four signals and decrements the distance to travel value in RAM upon each such detection. As the distance to travel value decreases, different ROM locations will be addressed in order to generate progressively lower command velocity values. This mode of operation of the processor 62 shall be referred to as a coarse velocity mode of operation.

When the carriage has been moved to within a predetermined number of motor steps of its desired stopping position, e.g., three, the processor 62 enters a fine velocity mode of operation. In this mode, the processor 62 senses the state of a velocity signal which is true when the actual velocity of the carriage exceeds a predetermined level and is false when it does not. Ultimately, the carriage 20 will have been moved to within one motor step of its desired stopping position. After a predetermined time delay, the master processor 62 will enter a damping mode of operation, where the carriage 20 is reliably moved and stopped at the next succeeding step of the carriage motor 34. This entire procedure as just described is essentially identical with respect to movement of the print wheel 22 and will be discussed in much greater detail below in connection with FIGS. 10-15. At this time, it should be noted that the master processor 62 achieves all the functions above-described under control of a suitable microprogram stored in its internal ROM.

Figure 2:
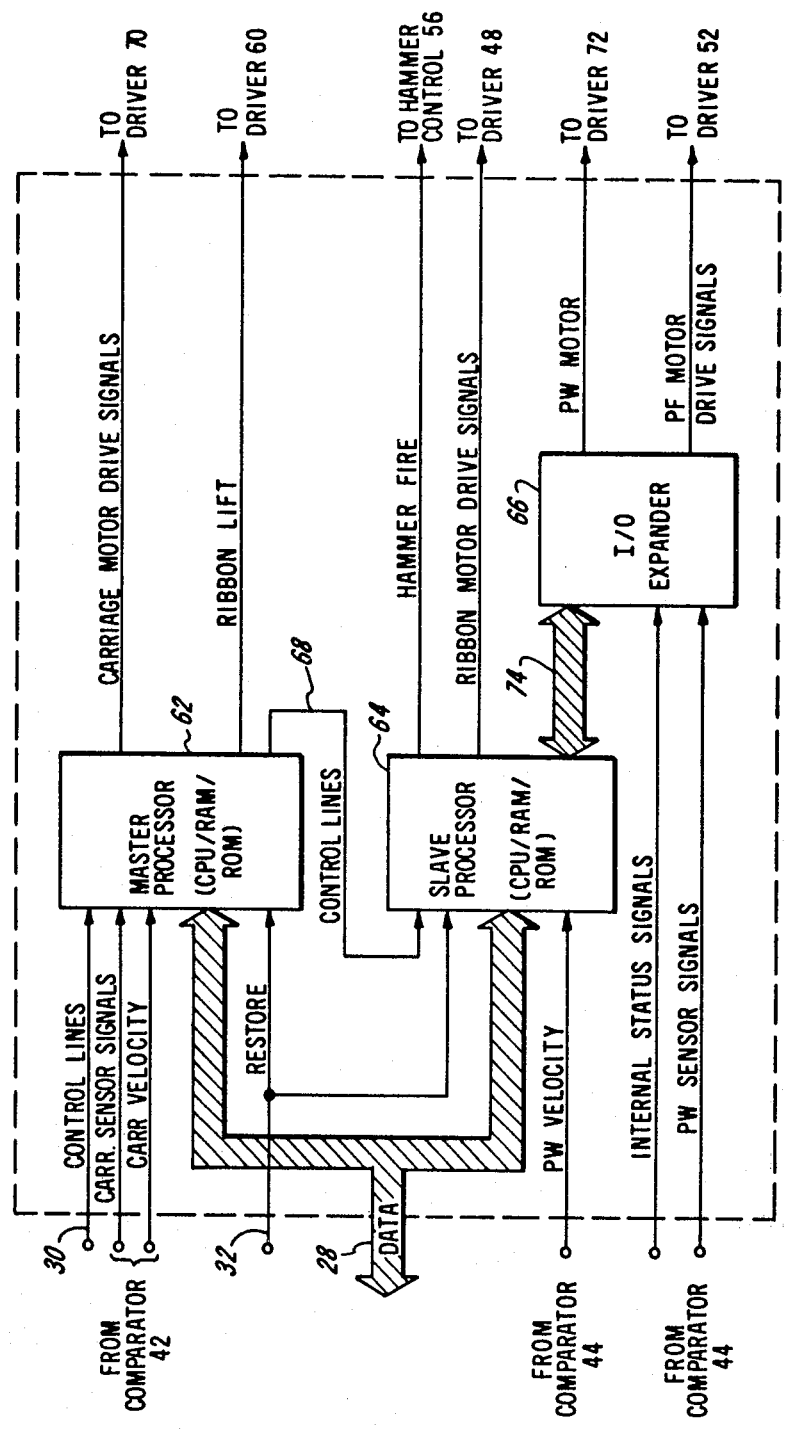
FIG. 2 is a block diagram representation of the processor depicted in FIG. 1.

The slave processor 64 depicted in FIG. 2 is preferably a multi-function IC chip which, like the master processor 62, is composed of an 8-bit microprocessor section, a RAM section capable of storing 64, 8-bit words, and a ROM section capable of storing 1,024, 8-bit words. The slave processor 64 also includes all necessary internal busses and control lines necessary to transfer data between and among the various sections thereof. A presently preferred IC chip having the characteristics of the slave processor 64 as just described is the Intel 8041 microcomputer chip manufactured by Intel Corporation. As with the ROM of the master processor 62, the ROM of the slave processor 64 stores both velocity command information and a suitable microprogram for controlling the operation of the slave processor 64.

The slave processor 64 is primarily responsible for generating the four PRINT WHEEL MOTOR DRIVE signals to drive the print wheel motor 36, the four PAPER FEED MOTOR DRIVE signals to drive the paper feed motor 50, the four RIBBON MOTOR DRIVE signals to drive the ribbon motor 46, and the HAMMER FIRE signal to control the hammer solenoid 54.

The slave processor 64 is connected to the data bus 28 for receiving data from the interface 24 via the master processor 62 which relates to control of the print wheel motor 36, paper feed motor 50, ribbon motor 46 and hammer solenoid 54. In the case of control of the print wheel motor 36, the data forwarded along the data bus 28 is a 16-bit signal comprised of two, 8-bit words, wherein the 4-high-order bits signify a PRINT WHEEL command and the 7 lowest-order bits represent in ASCII code the character element on the print wheel 22 desired to be impacted by the hammmer, as discussed above.

The slave processor 64 converts the incoming ASCII code into an 8-bit word indicative of the rotational position of the character element around the print wheel 22. It then compares this "desired position" information with another 8-bit signal stored in the RAM of the processor 64 indicative of the actual rotational position of the print wheel 22. The result of the comparison is a "distance to travel" position signal which is applied as an address to the internal ROM of the processor 64 to generate the desired command velocity data in a manner to be described in more detail below with reference to FIGS. 10.

The actual velocity of the print wheel 22 is derived by the processor 64 in a similar manner as the processor 62 derived the actual velocity of the carriage 20. Specifically, the processor 64 uses internal RAM locations as a counter which it resets at each step of the print wheel motor. Successive motor steps are detected from the PRINT WHEEL SENSOR signals supplied to the processor 64 in a manner to be described below. The actual velocity data is then compared with the command velocity data to derive error velocity data in the form of four PRINT WHEEL MOTOR DRIVE signals that are supplied by the processor 64 through the I/O expander 66 to the drivers 72.

As will be explained in more detail below, there are actually two command velocity values generated for each distance to travel value greater than three motor steps, thereby defining two command velocity profiles. In comparing the actual velocity value with these two profile values, if the actual velocity of the print wheel 22 is less than the lower velocity command value (representative of the minimum desired velocity level) for the particular distance remaining to travel, the print wheel motor 36 is accelerated. On the other hand, if the actual velocity value is greater than the lower command velocity profile value, but less than the upper command velocity profile value (representative of the maximum desired velocity level), then the print wheel motor is allowed to coast. Lastly, if the actual velocity is greater than the upper command velocity profile value for the particular distance remaining to travel, then the print wheel motor 36 is decelerated. Again, both the actual velocity values and the pair of command velocity profiles are stored as time counts (actual or desired) between adjacent motor steps.

When the print wheel 22 is rotated to within 3 motor steps of the desired stopping position, the processor 64 enters a fine velocity mode similar to that for the carriage movement. When the print wheel is brought to within one motor step of the desired stepping position, i.e., ½ character space away, the slave processor 64 enters a damping mode after a predetermined time delay to bring the print wheel motor 36 to a stop at the position desired. Again, this entire procedure of position control will be described in more detail below with reference to FIGS. 10-15.

The slave processor 64 also receives control signals on lines 68 from the master processor 62, such as DATA STROBE signals for strobing incoming data on the data bus 28 from the interface 24 via the master processor 62 into the slave processor 64. The slave processor 64 further receives the RESTORE signal on line 32 from the interface 24 for resetting same.

In an effort to expand the input-output capacity of the slave processor 64, the I/O expander 66 is provided. As shown in FIG. 2, the slave processor 64 directly outputs the four RIBBON MOTOR DRIVE signals and the HAMMER FIRE signal. The latter signals goes true when the print wheel 22 has been rotated by its motor 36 to bring a selected character element into alignment with the hammer element at a print position, as is conventional The I/O expander 66 outputs the four PRINT WHEEL MOTOR DRIVE signals, having received same over an internal bi-directional processor bus 74 coupled between predesignated outputs of the slave processor 64 and predesignated inputs of the I/O expander 66. Thus, the slave processor 64 computes the values of the four PRINT WHEEL MOTOR DRIVE signals on the basis of the velocity value comparisons discussed above and supplies these signals over the bus 74 to the I/O expander, which then supplies it to the drivers 72. The four, 90° phase-displaced PRINT WHEEL SENSOR signals, which are required by the slave processor 64 to monitor movement of the print wheel 22, by detecting zero crossings in the manner alluded to above relative to the CARRIAGE SENSOR signals, are initially supplied to the I/O expander 66 from the comparator 44 and are then forwarded along the bus 74 to the slave processor 64.

The I/O expander additionally receives the four PAPER FEED MOTOR DRIVE signals from the processor 64 along the bus 74 for output by the I/O expander 66 to the drivers 52. Lastly, the I/O expander 66 receives various status signals generated internally of the printer 10 by special sensors (not shown), such as PAPER OUT, COVER OPEN, RIBBON OUT and PRINT WHEEL HOME. These status signals are supplied by the I/O expander 66 to the slave processor 64 along the bus 74 for eventual application by the slave processor 64 along the bus 28 to the interface 24, and then along the bus 14 to the host controller 12. As with the case of incoming data on the bus 28, which all goes first to the master processor 62 and then back along the bus 28 to the slave processor 64 if related to the signals processed and outputted by the slave processor 64, outgoing data on the bus 28, such as status signals which eminate from the slave processor 66, will first be directed over the bus 28 to the master processor 62 and then by the master processor 62 back over the bus 28 to the interface 24. Again, the requisite programs for controlling the operations of the processors 62 and 64 and stored in their respective internal ROM's.

Figure 12:
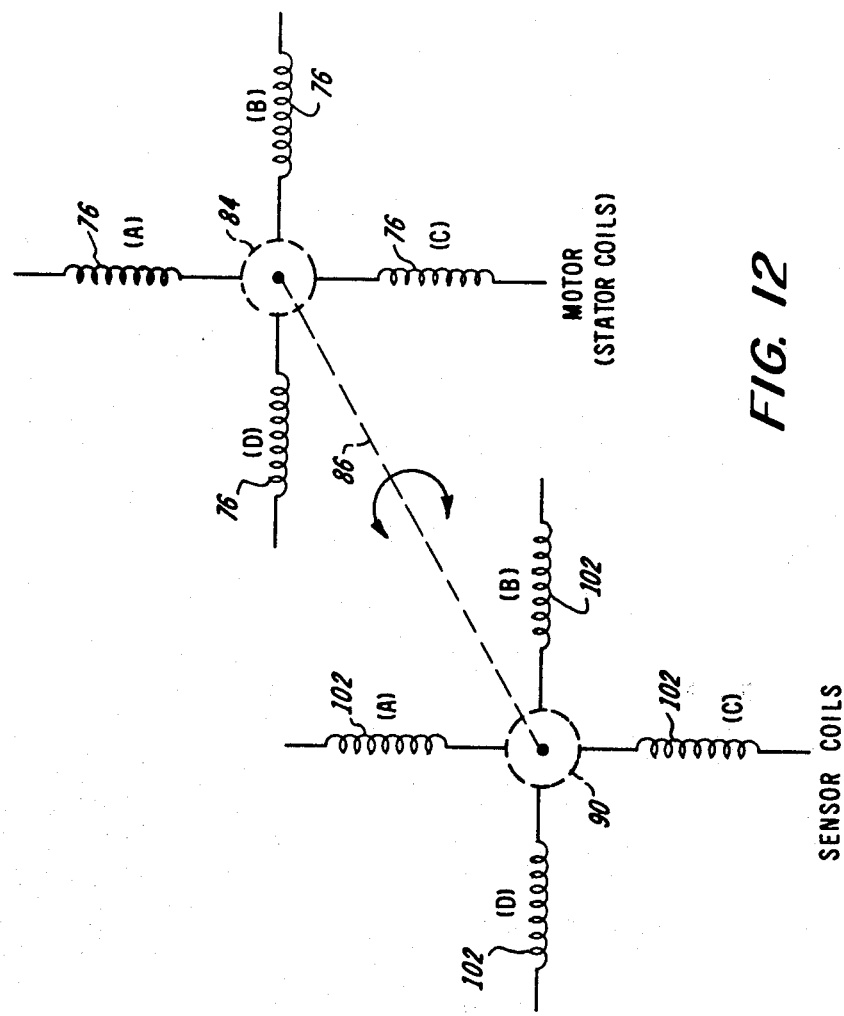
FIG. 12 shows the mechanical and rotational relationship of the print wheel or carriage motor to its associated sensor.

Reference is now made to FIGS. 3, 4 and 12, were the presently preferred print wheel motor 36 and associated print wheel sensor 40 is shown. In accordance with the preferred embodiment, the carriage motor 34 and carriage sensor 38 are respectively identical to the print wheel motor 36 and print wheel sensor 40, and so the description of the motor 36 and sensor 40 should be deemed equally applicable to the motor 34 and sensor 38.

The motor 36 depicted in FIGS. 3 and 4 is a stepper motor, preferably of the 4-phase, permanent magnet type. The four stator coils 76 (A,B,C and D) are depicted in the diagrammatic representation of FIG. 12. A simplified representation of the rotor 84 of the motor 36 is shown in phantom in FIG. 12, for ease of explanation of the basic concept sought to be depicted in that Figure , as will be described below. The motor 36 includes a drive shaft 86 to which a print wheel 22 may be replaceably mounted directly or through a gear at an end 88, and to which a rotor 90 of the print wheel sensor 40 is fixedly mounted at another end 92.

Referring now more specifically to the print wheel sensor 40, it includes four mechanically displaced pole pieces 94, 96, 98 and 100, each having a coil 102 (A,B,C and D) wrapped around an inwardly projecting tooth 104. The rotor 90 has a plurality of spaced teeth 106 uniformly spaced about the periphery thereof. Between each pair of adjacent teeth 106 is a recess 108, which is preferably concave in shape. There are preferably twelve teeth 106 about the periphery of the rotor 90 to match the motor 36 which preferably has twelve pole pairs. This one to one correspondence of rotor teeth to pole pairs is not essential, however, as will be made clear below. The radial length of each tooth 106 is such that a gap 105 (see FIG. 4) of predetermined dimension is defined between the circular path of movement of the outer end of each tooth 106 and the adjacent teeth 104 of the pole pieces 94, 96, 98 and 100. In the preferred embodiment, the rotor 90 is manufactured of a ferrous powdered metal material for low cost and in order to conduct magnetic flux.

The pole pieces 94, 96, 98 and 100 form an integral part of a mounting bracket disk 110 which is bolted to a side plate 112 of the motor 36. The pole pieces 94, 96, 98 and 100 are protected against foreign contamination by means of a cover member 114 (FIG.4 only) bonded to the peripheral edge of the disk 110. The disk 110 with integral pole pieces 94, 96, 98 and 100, and the plate 112 are preferably manufactured from ferrous powdered metal.

A permanent magnet 116 is affixed to the side plate 112 adjacent the rotor 90 of the sensor 40. The magnet 116 is preferably cylindrical having a central cylindrical opening 118 through which the motor drive shaft 86 may extend. The longitudinal dimension of the magnet 116 is such that, when mounted to the side plate 112, it leaves a uniform gap 120 of predetermined thickness between itself and the rotor 90. The axially magnetized magnet 116 constitutes a flux producing means for producing a path of normally substantially constant magnetic flux through the rotor 90, and thus adjacent the coils 102.

As the rotor 90 is rotated by the drive shaft 86, the resultant electromotive force induced in the coils 102 will cause four, 90° phase-displaced sensor signals to be respectively produced at the outputs of the four coils 102). In the preferred embodiment, the output signals of the coils 102 (A and C) are combined, as are the output signals of the coils 102 (B and D). This reduces noise and provides a more reliable sinusoidal waveform for accurate zero crossing detection. The resultant two, 90° phase-displaced substantially sinusoidal signals produced at 102 (A-C) and 102 (B-D) will each vary in amplitude and frequency in proportion to the rotational speed of the motor drive shaft 86, and thus of any print wheel 22 mounted thereto. What is happening is that each coil 102 is essentially sensing the rate of change of flux with respect to time. When a tooth 106 on the rotor 90 is aligned with the tooth 104 of an adjacent pole piece, there is maximum flux, but the rate of change of such flux, i.e., the derivative of flux, is zero, so that the signal output of that coil 102 will be zero. Likewise, whenever the rotor 90 is not rotating, all four coils 102 will produce a zero output signal, since there will be no rate of change of flux.

In essence, the teeth 106 of the rotor 90 cooperate with the pole pieces 94, 96, 98 and 100 during rotation of the rotor 90 to vary the level of the magnetic flux through the rotor teeth and adjacent each of the coils 102 in dependence upon the direction, speed and distance of rotation of the drive shaft 86, whereby the resultant electromotive force induced in each coil 102 defines an electrical sensor signal thereacross which contains information indicative of the direction, speed and distance of rotation of the drive shaft 86. As indicated above, the two electrical sensor signals produced by combining the outputs of coils 102(A and C) and the outputs of coils 102(B and D), and hereinafter referred to as sensor signals A-C and B-D, are mutually electrically phase-displaced by 90°. At a constant velocity of rotation of the drive shaft 86, each sensor signal is periodic with a peak amplitude and frequency proportional to the angular velocity of the drive shaft 86, has a polarity indicative of the direction of rotation of the drive shaft, and has a period representative of a predetermined increment of movement of the drive shaft 86.

It is not essential that there be four, mechanically displaced coils 102, as shown in FIGS. 3 and 12. It is important, however, that there be at least two coils 102, such as coils 102(A) and 102(B) (FIG. 12), which are selected and displaced so as to produce two 90° phase-displaced substantially sinusoidal sensor signals. As indicated above, however, it is preferred to use all four coils 102, and combine the outputs of 102(A and C) and 102(B and D) to produce sensor signals A-C and B-D.

It is important that the ultimate sensor signals produced are capable of being processed by the slave processor 64 in a manner by which the individual steps of movement of the motor 36 is sensed. Thus, the arrangement and number of teeth 104 on the sensor rotor 90 have to be carefully selected to achieve this result. In the preferred embodiment, the rotor 84 of the motor 36 is capable of producing 48 steps per revolution of the drive shaft 86. Similarly, the rotor 90 of the sensor is capable of generating the waveforms at composite coils 102(A-C) and 102(B-D) which, when complemented by the comparator 44 to develop four, 90° phase-displaced square-wave sensor signals, can be used through zero-crossing sensing techniques to detect the same 48 steps per revolution of the drive shaft 86. The specific manner by which this is accomplished will be described below. At this time, however, it should be noted that as each tooth 104 on the rotor 90 moves between the coils 102(A) and 102(B) of the sensor 40, 12 steps can be detected from the four waveforms ultimately generated by the comparator 44. It must be made clear that the rotor 90 may have more or less than twelve teeth and still be capable of use with a 48 step motor. This may be accomplished through the use of appropriate electrical means to derive the requisite four, 90° phase-displaced square-wave sensor signals.

Figure 5:
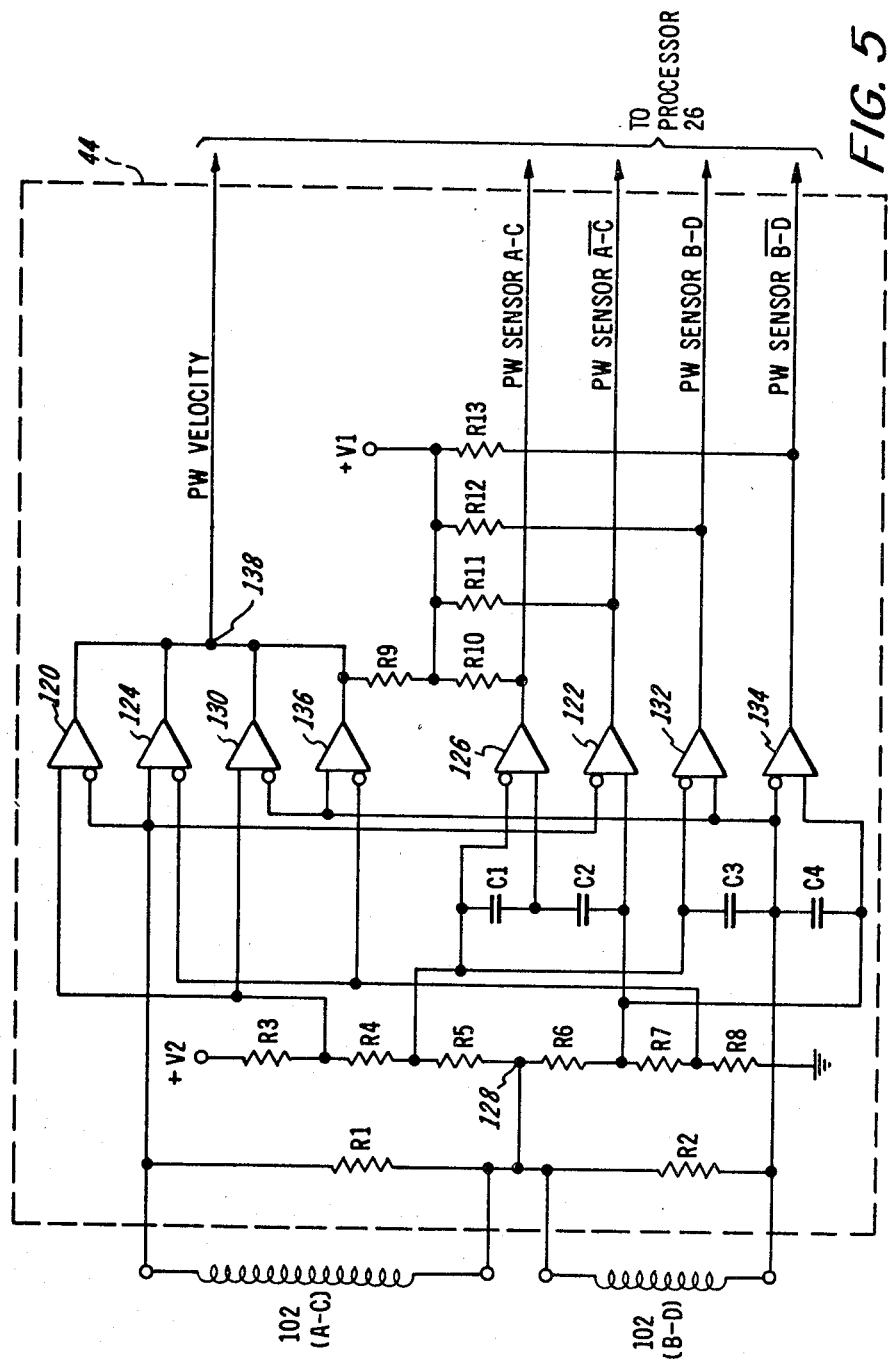
FIG. 5 is a schematic circuit diagram of the print wheel comparator depicted in FIG. 1.
Figure 6:
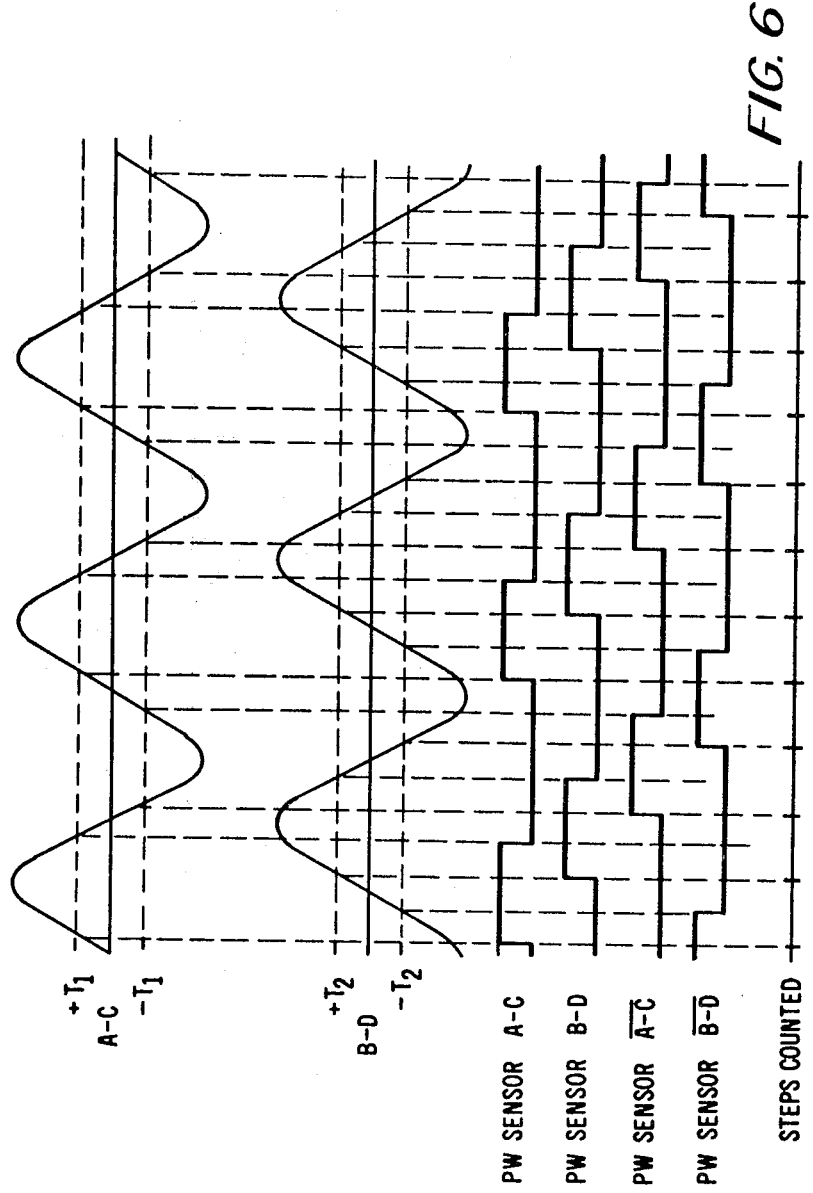
FIGS. 6-9 show various signal waveforms of the input and output signals depicted in FIG. 5.

Reference is now made to FIGS. 5 and 6, where the print wheel comparator 44 and exemplary waveforms for the four, 90° phase-displaced square-wave PRINT WHEEL SENSOR signals will be described. It should be noted first that the print wheel comparator 44 and carriage comparator 42 are preferably identical, and so only the print wheel comparator 44 will be described in detail. Secondly, it should be noted that the waveforms depicted in FIG. 6 represent a case where the velocity of the drive shaft 86 is at a constant level. However, it will be recalled from above that both the amplitude and frequency of the waveforms A-C and B-D produced at the composite outputs of the coils 102(A-C) and 102(B-D) will vary in proportion to the angular velocity of the drive shaft 86.

Referring now specifically to FIG. 5, the two composite output signals A-C and B-D are connected to respective inputs of the comparator 44. More specifically, one end of each of the coils 102(A) and 102(C) is connected to the inverting inputs of two operational amplifiers 120 and 122, and to the non-inverting inputs of two other operational amplifiers 124 and 126. The other end of each of the coils 102(A) and 102(C) is connected to the center node 128 of a voltage divider network consisting of a first resistor R1 connected between the ends of the coil 102(A), a second resistor R2 connected in series with the first resistor R1 and ground. The resistor R2 is also connected across the ends of each of the coils 102(B) and 102(D).

The center node 128 is located electrically between the two resistors R1 and R2, as well as between two sets of three resistors each, i.e., a first set of resistors R3, R4 and R5 connected in series between a supply voltage +V2 and the center node 128 and a second set of resistors R6, R7 and R8 connected in series between the center node 128 and ground. The electrical junction of the resistors R3 and R4 is connected to the non-inverting inputs of the amplifier 120 and another operational amplifier 130. The electrical junction of the resistors R4 and R5 is connected to the inverting inputs of the amplifier 126 and another operational amplifier 132. The electrical junction of the resistors R6 and R7 are connected to the non-inverting inputs of the amplifier 122 and yet another operational amplifier 134. Lastly, the electrical junction of the resistors R7 and R8 is connected to the inverting inputs of the amplifier 124 and still another operational amplifier 136.

Still referring to FIG. 5, four filter capacitors C1, C2, C3 and C4 are preferably included in the circuit of comparator 44. The first capacitor C1 is connected across the two inputs of the amplifier 126, the second capacitor C2 is connected across the two inputs of the amplifier 122, the third capacitor C3 is connected between the inverting inputs of amplifiers 132 and 134, and the fourth capacitor C4 is connected between the two inputs of amplifier 134.

Completing a review of the circuitry of the comparator 44, the outputs of the amplifiers 120, 124, 130 and 136 are wire-ORed at junction 138 to define the PRINT WHEEL VELOCITY signal developed by the comparator 44. The junction 138 is tied to a predefined voltage source +V1 through a resistor R9. The outputs of the amplifiers 126, 122, 132 and 134 are all tied to the voltage source +V1 through respective resistors R10, R11, R12 and R13. The resistors R9-R13 are preferably matched. Additionally, the resistors R1, R2 and R8 are preferably matched, as are the resistors R5 and R6, as well as resistors R4 and R7. The capacitors C1-C4 are also preferably matched.

The specific values of the resistors R1-R8 and voltage source +V2 are selected such that a predetermined threshold voltage level T1 (e.g., equivalent to a velocity of 6.0 radians per second of the drive shaft 86) is presented at the inverting inputs of amplifiers 126 and 132 and at the non-inverting inputs of amplifiers 122 and 134. The threshold level T1 is chosen such that only velocities of the drive shaft 86 above a predetermined level will succeed in generating the A-C and B-D, 90° phase-displaced sine-waves from the coils 102(A and C) and 102(B and D) with an amplitude above the threshold voltage T1. In this respect, it will be recalled that the amplitude and frequency of each of the sine-waves A-C and B-D are proportional to the velocity of the drive shaft 86. Thus, if the actual velocity of the drive shaft 86 falls below the predetermined level, the resultant amplitude of the signals A-C and B-D will fall below the threshold level T1 (positive) and −T1 (negative). This will then result in a zero output voltage from each of the amplifiers 126, 122, 132 and 134.

FIG. 6 depicts the waveforms A-C and B-D at a constant velocity of the drive shaft 86 above the predetermined threshold level, i.e., the peak positive amplitude of the signals A-C and B-D are above the threshold voltage +T1. Notice that the output of the amplifier 126, i.e., PW SENSOR A-C, is true or high only for so long as the waveform A-C exceeds the threshold level +T1. Likewise, the PW SENSOR B-D output of the amplifier 132 is true for so long as the waveform B-D is above the threshold level +T1. In addition, the PW SENSOR $\overline{\text{A-C}}$ output of the amplifier 122 is true for so long as the waveform A-C is below the negative threshold level −T1, and the PW SENSOR $\overline{\text{B-D}}$ output of the amplifier 134 is true for so long as the waveform $\overline{\text{B-D}}$ is below the negative threshold level −T1.

The four PRINT WHEEL SENSOR signals as just described are forwarded to the processor 26. Specifically, they are forwarded directly to the I/O expander 66 (FIG. 2) and then supplied over the bus 74 to the slave processor 64. The microprocessor portion of the slave processor 64 is then operated under program control to detect the positive going transition of each of the four PRINT WHEEL SENSOR signals. Each such detection represents a step of the motor 36 to be counted, as depicted in FIG. 6. Accordingly, the microprocessor portion of the slave processor 64 supplies each step count to an internal RAM location for updating (counting down) the distance to travel position signal stored at that RAM location, as described earlier. The value of the distance to travel signal is periodically accessed by the microprocessor portion of the slave processor 64 under program control to serve as address signals for the slave processor's internal ROM, to thereby generate the appropriate dual command velocity profiles to be described below in connection with FIG. 10.

Figure 7:
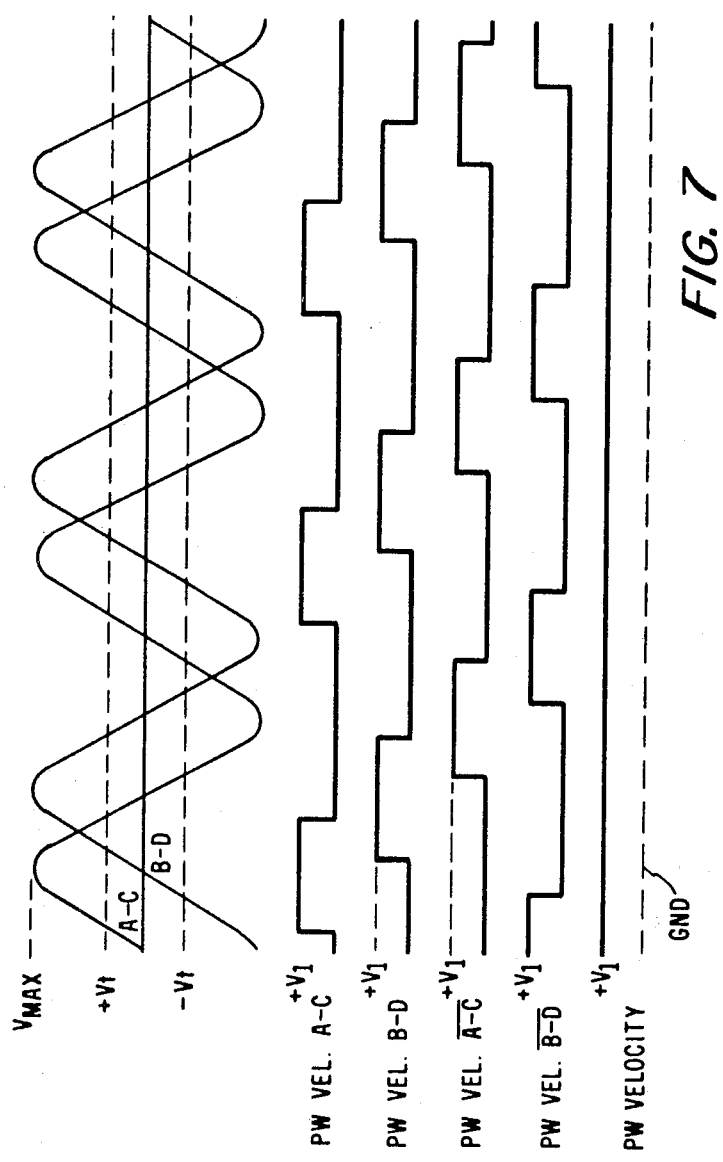

Referring now to FIGS. 5 and 7-9, the manner by which the PW VELOCITY signal is generated by the comparator 44 will be described. The value of the resistors R3-R8 in conjunction with the voltage source +V2 define a velocity threshold level +Vt, which is presented at the non-inverting inputs of the amplifiers 120 and 130, as well as at the inverting inputs of the amplifiers 124 and 136. In the preferred embodiment, the value of the threshold voltage +Vt is selected at an angular velocity of the drive shaft 86 of 25 radians per second. In other words, at a velocity of 25 radians per second, the A-C and B-D waveforms would have peak amplitudes of voltage level Vt. The amplifiers 120, 124, 130 and 136 respectively produce the velocity signals PW VELOCITY A-C, PW VELOCITY $\overline{\text{A-C}}$, PW VELOCITY B-D and PW VELOCITY $\overline{\text{B-D}}$ at their outputs. These four signals are shown in FIG. 7, where it will be noted that the signal waveforms A-C and B-D are derived at a constant velocity of the drive shaft 86 which is of a magnitude such that the maximum peak voltage level of the waveforms are above the threshold level Vt.

The signal PW VELOCITY A-C in FIG. 7 is true for the duration the signal waveform A-C is above the threshold level +Vt, and the amplitude of each pulse is substantially equal to the source voltage +V1. Similarly, the signal PW VELOCITY B-D is true for the duration the signal B-D is above the threshold level +Vt. Additionally, the signal PW VELOCITY $\overline{\text{A-C}}$ is true for the duration the signal A-C is more negative than the threshold level −Vt, and the signal PW VELOCITY $\overline{\text{B-D}}$ is true for the duration the signal B-D is more negative than the threshold level −Vt. When these four signals are wire-ORed at junction 138, the PW VELOCITY signal is produced. In the example of FIG. 7, the PW VELOCITY signal is a d-c signal having a voltage substantially equal to the source voltage +V1. The reason it is a d-c signal is because there is always one of the four, 90° phase-displaced square-wave signals PW VELOCITY A-C, $\overline{\text{A-C}}$, B-D and $\overline{\text{B-D}}$ true at any instant of time, and they all have the same amplitude of about +V1.

Figure 8:
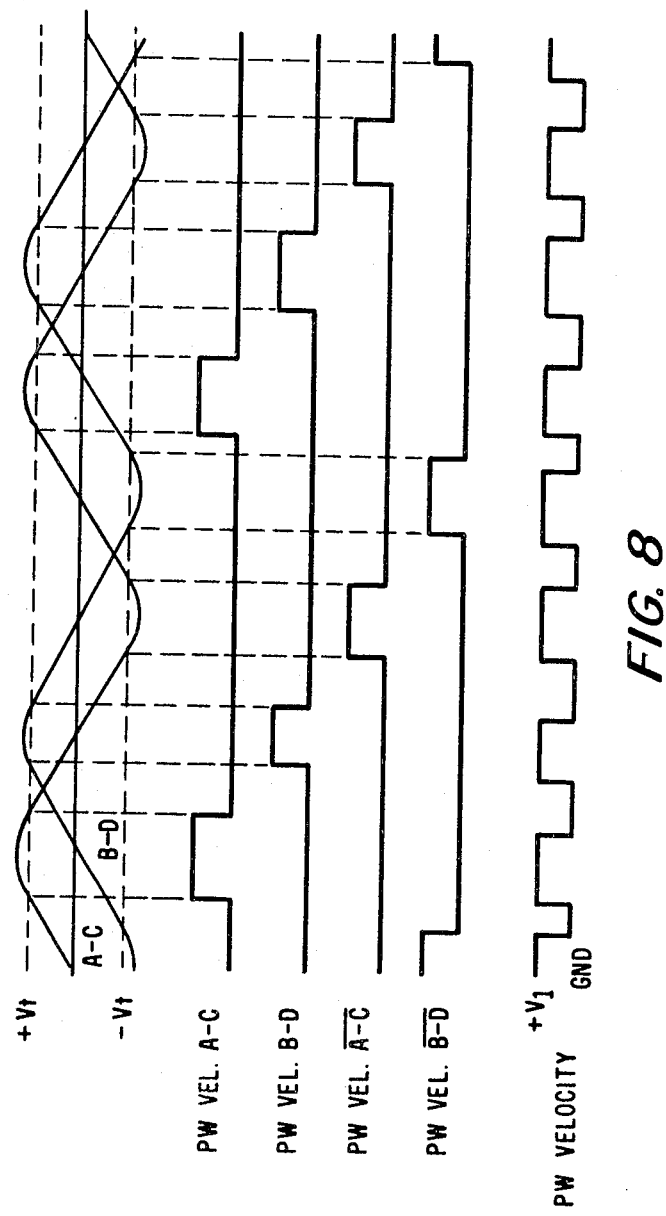

In the example of FIG. 8, the drive shaft 86 is rotating only slightly faster than the threshold velocity Vt. In this instance, there is not always one of the four outputs of the amplifiers 120, 124, 130 and 136 true at any instant. The result is the PW VELOCITY signal pulse train depicted in FIG. 8. Again, however, the amplitude of each pulse is approximately +V1.

Figure 9:
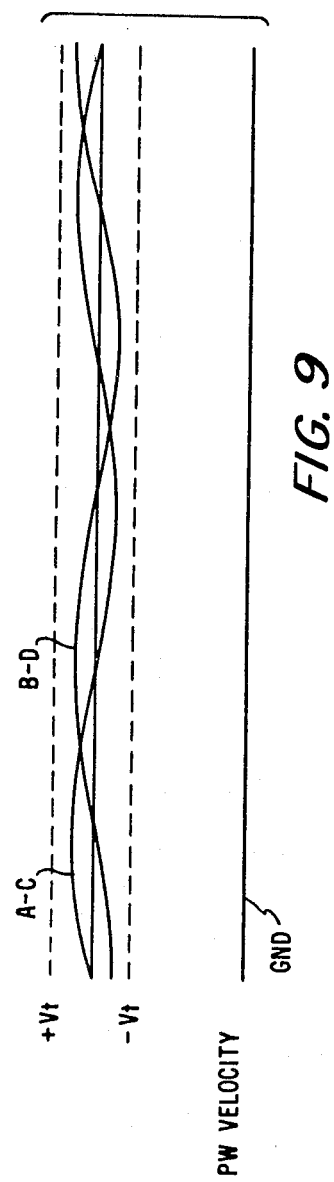

In the example of FIG. 9, the drive shaft 86 is rotating slower than the threshold velocity Vt, level, i.e., slower than 25 radians per second in the preferred embodiment, so that the peak amplitudes of the waveforms A-C and B-D will be less than the threshold voltage +Vt. In this event, the outputs of all four amplifiers 120, 124, 130 and 136 will be zero or ground, thereby making the PW VELOCITY signal equal to ground (false).

It is thus apparent that what the processor 26 detects in receiving the PW VELOCITY signal is whether or not the actual angular velocity of the drive shaft 86 is above or below the threshold velocity, e.g., 25 radians per second. More specifically, if it is above 25 radians per second, at least a pulse train (FIG. 8) will be produced or, at higher velocities, a d-c "true" level. When the actual velocity falls below 25 radians per second, the PW VELOCITY signal will go false. The PW VELOCITY signal is primarily used by the processor 26 during the last three steps of rotation of the print wheel motor 36 to rotate the print wheel 22 closer toward the desired stopping position, as will be explained below.

Figure 10:
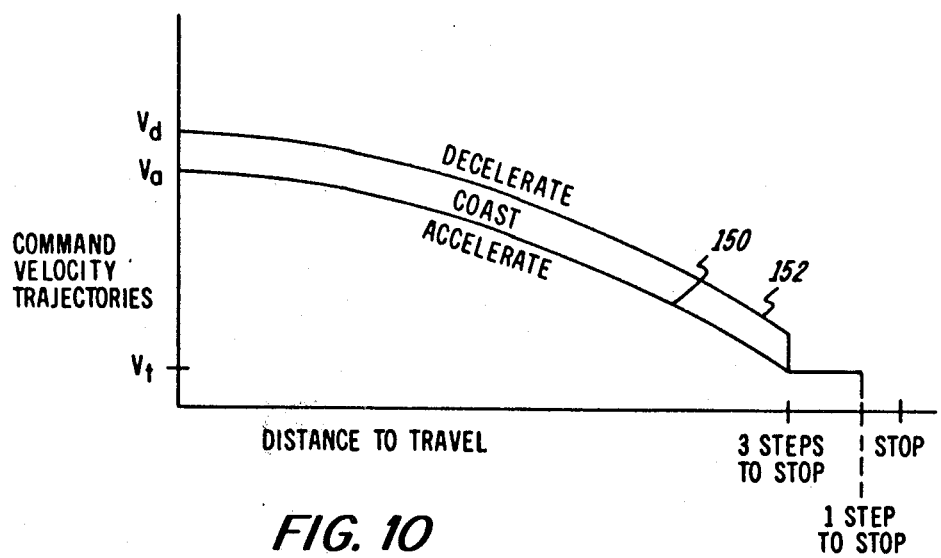
FIG. 10 is a graphical representation of the command velocity trajectories for either the print wheel or carriage depicted in FIG. 1 as a function of the distance to travel of such component.

Reference is now made to FIGS. 10-15, where the process for bringing a print wheel 22 from one stopped position to another stopped position involving the rotation of the wheel will be described. Referring first to FIG. 10, and as discussed briefly above, the ROM internal to the slave processor 64 (FIG. 2) includes various address locations storing data representative of predetermined command velocity levels. There are two command velocity profiles 150 and 152, as depicted in FIG. 10. At any particular distance to travel greater than a predetermined distance, e.g., 1-½ character spaces as defined by 3 steps of the print wheel motor 36, the updated distance to travel data in RAM is used to address a ROM location which defines the command velocity value for the higher command velocity profile 152 for that particular distance to travel. In actuality, the binary word stored at each addressed ROM location defines a desired count, i.e., time, between adjacent steps of the print wheel motor 36. Thus, the higher command velocity profile 152 is stored as desired times indicative of desired velocities. However, the result is the same, since the slave processor 64, receiving the four PW SENSOR signals via the I/O expander 66 and bus 74, can detect stepped advancement of the print wheel motor 36. At each step, the processor 64 resets a counter defined in an internal RAM location. The counter counts at a rate significantly greater than the minimum period between steps of the motor 36 when running at maximum speed. In this manner, the value of the count in the RAM counter is inversely proportional to the actual speed of the drive shaft 86 and thus print wheel motor 36.

When the value of the upper command velocity profile 152 has been accessed, the slave processor 64 then computes the value of the lower command profile by simply adding a predetermined count (e.g., two counts) to the time count value of the profile 152 accessed. The slave processor 64 then compares under program control the time count indicative of actual velocity (as accessed from RAM) with the time counts of the two command velocity profiles (one accessed from ROM and the other calculated) at the particular distance remaining to be traveled. If the actual velocity count is greater than the lower command velocity profile 150, i.e., the actual velocity is less than a minimum desired command velocity, the processor 64 issues appropriate four PW MOTOR DRIVE signals which switch the drivers 72 such as to cause the print wheel motor to accelerate.

As the print wheel 22 is advanced toward its desired stopping position, the distance to travel value stored in the internal RAM of processor 64 is constantly updated at each step of the motor 36. Correspondingly, the time count in RAM indicative of actual velocity is compared each processor cycle with the time counts of both command velocity profiles 150 and 152. Eventually, the actual velocity of the motor 36 will exceed that identified by the lower profile 150, but still be less than the upper profile 152, as representative of a maximum desired velocity profile. In this case, the four PRINT WHEEL DRIVE signals issued by the slave processor 64 via the bus 74 and I/O expander 66 will cause the motor 36 to coast. If, during acceleration, the motor speed overshoots and exceeds the level identified by the upper command profile 152, the processor 64 would command the motor 36 to decelerate, through the issuance of appropriate PRINT WHEEL DRIVE signals.

Figure 11:
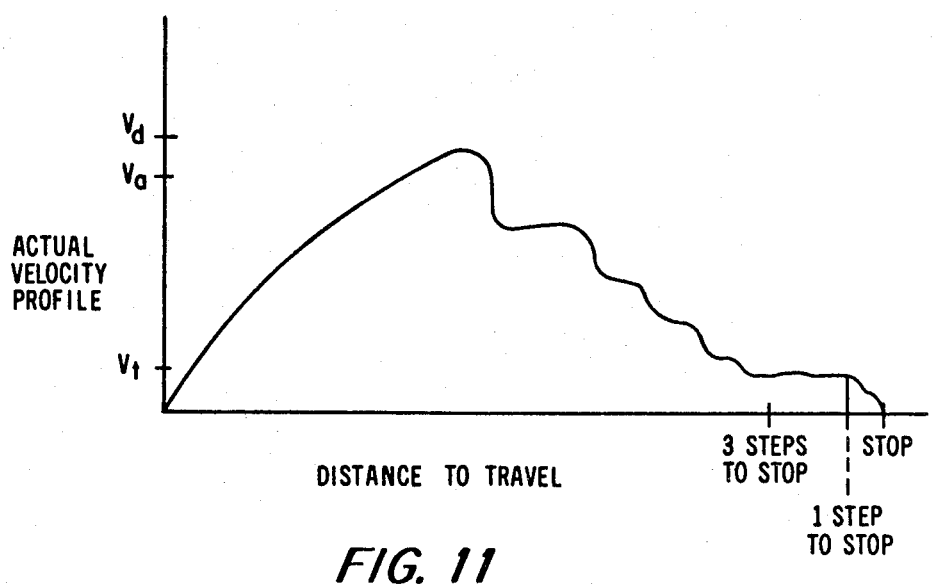
FIG. 11 is a graphical representation of the actual velocity profile for either the print wheel or carriage depicted in FIG. 1 as a function of the distance to travel.

Eventually, the print wheel motor 36 would have advanced the print wheel 22 to within 1-½ character elements of the desired stopping position, i.e., 3 steps of the motor 36. From 3 motor steps to travel to within 1 motor step to travel (½ character space away), the slave processor 64 controls the print wheel motor 36 in accordance with a "fine velocity mode" of operation, wherein the value of the PW VELOCITY signal is simply looked at or sensed by the slave processor 64 each processing cycle. If it is false, indicating a lower actual velocity than the 25 radian per second command velocity, the slave processor 64 causes the print wheel motor 36 to accelerate in the manner above-described through control of the four PRINT WHEEL MOTOR DRIVE signals. If the PW VELOCITY signal is true, indicating a higher actual velocity than 25 radians per second, the motor 36 is controlled to decelerate. In other words, it is desired to maintain the actual velocity of the drive shaft 86 and thus print wheel 22 at or about 25 radians per second between 3 and 1 motor steps (1-½ character spaces to ½ character space) remaining to be traveled. The actual velocity of the motor 36 from its starting position, at the maximum rotational distance to travel, to a stop position is depicted in FIG. 11. During movement from 3 steps to 1 step, the processor only looks at the PW VELOCITY signal. It does not any more cyclically compare the actual velocity data with the dual command velocity profiles, as was the case in the coarse velocity mode.

During the coarse and fine velocity modes as just described, it is important to note that the print wheel drive motor 36 is stepped by selectively turning on two adjacent coils 76 at a time by turning on the respective two of the four PW MOTOR DRIVE A, B, C and D signals. The use of two motor coils on to step provides greater flux and thus torque. Preferably, the motor is brought to a final stop with only one coil 76 on, in accordance with the damping mode of motion control to be described below. The same method of motion control is employed with respect to the carriage motor 34.

It should also be noted that, during initial acceleration, and at relatively low speeds, the two motor coils 76 that are on preferably lead the actual step position by 135°. For example, if a step occurred by a rotor tooth 106 passing in alignment with the sensor coil 102(A), the motor coils 76(A) and 76(B) would be turned off and the motor coils 76(B) and 76(C) turned on, thereby creating a command vector which leads by 135°. In order to reach higher speeds, the two motor coils 76 that are on preferably lead the actual step position by 225°. In the above example, after a step occurred by a rotor tooth 106 passing in alignment with the sensor coil 102(A), the motor coil 76(B) would be turned off and coil 76(D) turned on instead, thereby creating a command vector which leads by 225°.

The third mode of motion control, i.e., the "damping mode", is performed by the slave processor 64 during movement of the print wheel motor 36 the last step to the desired stopping position. This mode of operation will be described with reference to FIGS. 13-15. Referring for a moment again to FIG. 10, it will be apparent that the command velocity profile goes to zero at one step to travel and stays there for the duration of the damping mode.

Figure 13:
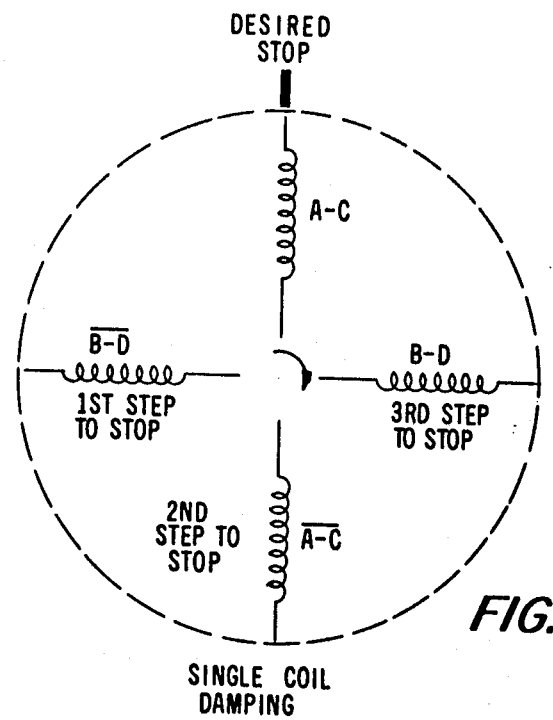
FIG. 13 shows the electrical relationship of the print wheel or carriage sensor signals to the presently preferred single coil electronic damping control mode executed by the processor of FIG. 1.
Figure 14:
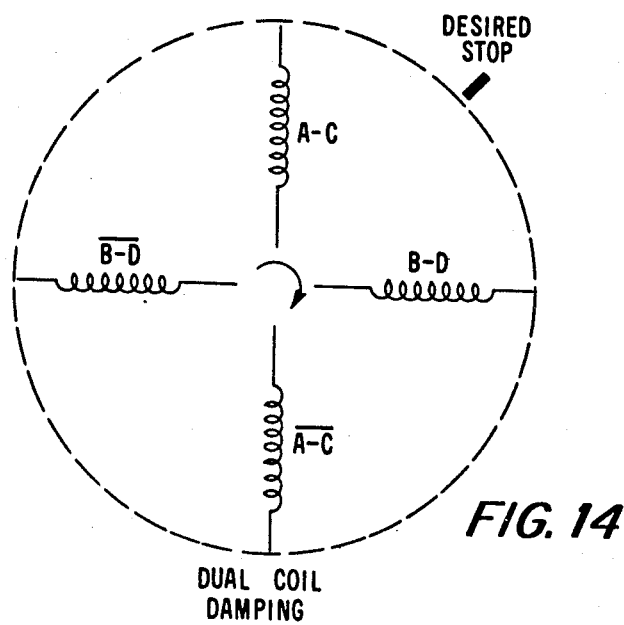
FIG. 14 shows the electrical relationship of the print wheel or carriage sensor signals to an alternative dual coil damping control mode executable by the processor of FIG. 1.

It must be made clear at the outset that FIGS. 13 and 14 do not depict any mechanical orientation of the print wheel sensor coils 102. Rather, they show the electrical 90° phase-displaced relationship among the four PRINT WHEEL SENSOR signals A-C, B-D, $\overline{\text{A-C}}$ and $\overline{\text{B-D}}$ developed by the comparator 44. Additionally, it should be noted that 360° of electrical revolution in the diagrams of FIGS. 13 and 14 corresponds to 1/12 or 30° of angular rotation of the sensor rotor 90 relative to the coils 102, as well as of the rotor 84 of the print wheel motor 36. Lastly, FIG. 13 depicts the preferred single coil damping mode of operation, where it is desired to stop the print wheel 22 with only a single one of the motor coils 76 turned on. FIG. 14 depicts an alternative dual coil damping mode of operation where it is desired to stop the print wheel with two adjacent motor coils 76 turned on.

Referring now specifically to the presently preferred single coil damping approach of FIG. 13, when the rotor 90 of the sensor rotating clockwise passes a location relative to the coils 102 such that the PW SENSOR B-D signal has a positive-going transition, the print wheel motor 36 will be three steps from the desired stopping position. The slave processor 64 then switches from the coarse velocity mode to the fine velocity mode, where it simply looks at the level of the PW VELOCITY signal during continued rotation of the rotor an additional two steps. All the while, the processor 64 attempts to maintain a constant angular velocity of 25 radians per second, as described above. Thus, the rotor 90 will leave a position with the PW SENSOR signal $\overline{\text{B-D}}$ at a positive going transition, i.e., the last step until the final stopping step is reached, with an angular velocity of approximately 25 radians per second.

It is between the conditions of a positive going transition of the PW SENSOR $\overline{\text{B-D}}$ signal and a positive going transition of the PW SENSOR A-C signal (or where that positive transition would have occurred at a greater than threshold velocity, in the event the actual velocity is below such threshold velocity) that the slave processor 64 executes a predetermined damping procedure. In accordance with the presently preferred damping procedure, when the rotor 90 rotates clockwise past the point of a positive going transition of the PW SENSOR $\overline{\text{B-D}}$ signal, the slave processor 64 turns on the PW MOTOR DRIVE A signal to turn on the motor stator coil 76(A) after a predetermined time delay, preferably of an amount sufficient to enable the drive shaft 86 and rotor 90 to advance approximately another electrical 45°. The processor also looks at the level of the PW SENSOR B-D and $\overline{\text{B-D}}$ signals. The PW SENSOR $\overline{\text{B-D}}$ signal will be high, assuming the waveform B-D is still below the negative threshold level-T1, and the PW SENSOR B-D signal will be low. In effect, the processor 64 is looking at the sign or polarity of the sinusoidal waveforms B-D and $\overline{\text{B-D}}$ (only B-D being shown in FIG. 6), which polarity is indicative of the direction of movement of the print wheel 22.

Now then, when the processor 64 detects a true PW SENSOR $\overline{\text{B-D}}$ signal following the occurrence of a positive-going transition of the PW SENSOR B-D signal and the turning on of the PW MOTOR DRIVE A signal (to turn on the motor stator coil 76A), the processor 64 also turns on the PW MOTOR DRIVE D signal, tending to slow the motor 36. When the motor 36 slows to the point that the waveform B-D falls below the threshold level T1, i.e., the PW SENSOR B-D signal goes low, the processor 64 turns off the PW MOTOR DRIVE D signal. However, the motor 36 is still advancing toward its desired stopping position (shown as aligned with the hypothetical "coil" A in FIG. 13).

If and when the motor 36 overshoots the desired stopping position, since the PW MOTOR DRIVE signal A is still on, it will start pulling the motor 36 back in a reverse direction. As soon as the motor direction reverses, the waveforms A-C and B-D invert, due to the magnetic characteristics of the print wheel sensor 40. As soon as the motor speed again exceeds the threshold level T1, the processor will detect a true PW SENSOR $\overline{\text{B-D}}$ signal and turn on the PW MOTOR DRIVE B signal, tending to slow the motor. This process is repeated until the motor never exceeds the threshold level T1 during oscillation about the stopping position. All the time during such oscillation below threshold level T1, the PW MOTOR DRIVE signal A is left on, i.e., only the coil 76(A) is left on. The motor will then be brought to a stop at the desired stopping position and the selected character element on the print wheel 22 impacted against an adjacent platen.

Figure 15:
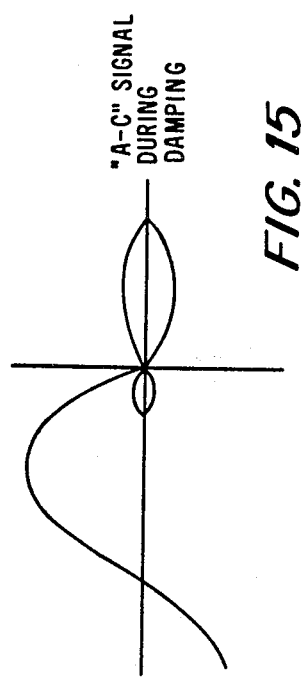
FIG. 15 shows the sine-wave induced in one of the print wheel or carriage sensor coils during electronic damping of the associated motor.

FIG. 15 shows the signal A-C waveform during a normal single coil damping procedure, as above-described. Notice that the polarity of the signal is reversed as the direction of the motor is reversed during the final damped oscillations.

It must be made clear that the three modes of motion control of the print wheel 22 as first described, i.e., coarse velocity, fine velocity and damping, are substantially identically used in connection with motion control of the carriage 20 by the master processor 62.

Having just described the presently preferred single coil damping mode procedure, two alternative single coil damping approaches will be described. In the preferred procedure as described with reference to the print wheel 22, in order to stop at "A-C" in FIG. 13, the processor 64 turns on the PW MOTOR DRIVE A signal and then also selectively turns on either the PW MOTOR DRIVE B signal or the PW MOTOR DRIVE D signal to damp. In a first alternative procedure, the processor 64 would still first turn on the PW MOTOR DRIVE A signal. However, it would then also selectively turn on either the PW MOTOR DRIVE C and D signals or the PW MOTOR DRIVE B and C signals to damp. The PW MOTOR DRIVE A signal would then be turned off when the PW MOTOR DRIVE C signal is turned on, or the PW MOTOR DRIVE A and C signals could be on at the same time. In a second alternative procedure, the PW MOTOR DRIVE A signal would be turned on and damping would occur by the processor 64 selectively turning on and off the PW MOTOR DRIVE C signal.

The single coil damping approaches thus far identified have assumed a four coil stepper drive motor. Suppose a two coil or bipolar drive motor was employed, i.e., coils 76(A) and 76(C) (FIG. 12) are the same coil and coils 76(B) and 76(D) are the same coil. There are three alternative single coil damping approaches for this type of stepper motor. First, the processor 64 could damp with the drive signal for coil 76(A-C) on and selectively pulse on and off the drive signal for coil 76(B-D) with proper polarity to achieve damping. Second, the processor 64 could damp by selectively reversing the drive signal for coil 76(A-C) only. Third, the processor 64 could damp by selectively reversing the drive signal for coil 76(A-C) and selectively pulsing the drive signal for coil 76(B-D).

FIG. 14 depicts generally the dual coil method of electronically damping the motor 36 during the damping mode of operation. As is noted, in dual coil damping, it is desired to stop the drive motor with two of its coils 76 on, e.g. between the hypothetical "coils" A-C and B-D. As will be recalled, the so-called "coils" A-C, B-D, $\overline{\text{A-C}}$ and $\overline{\text{B-D}}$ are merely representations of the four, 90° electrically phase-displaced sensor signals, where 360° of electrical displacement past the "coils" of FIG. 14 are equal to only 1/12 or 30° of a true rotational displacement of the motor drive shaft 86.

When "A-C" is passed during the last step, i.e., when the PW SENSOR A-C signal has a transition at a velocity exceeding the threshold level T1, the slave processor 64 looks at the PW SENSOR A-C and B-D signals. If the PW SENSOR B-D signal is true, it turns off the PW MOTOR DRIVE B signal, leaving the PW MOTOR DRIVE A signal on. Conversely, if the PW SENSOR A-C signal is true, the processor 64 turns off the PW MOTOR DRIVE A signal, leaving the PW MOTOR DRIVE B signal on. If both the PW SENSOR A-C and B-D signals are true, the processor 64 will leave on both the PW MOTOR DRIVE A and B signals. Eventually, through continued oscillation and slowing of the motor, neither the PW SENSOR A-C nor PW SENSOR B-D signals will be higher than the threshold level T1. In this event, the processor 64 will leave both PW MOTOR DRIVE A and B signals on to stop the motor between the A-C and B-D "coils".

The above dual coil damping approach is with a four coil stepper drive motor. In an alternative dual coil approach for such a motor, where it is desired to stop between "coils" A-C and B-D, the processor would have the PW MOTOR DRIVE B signal on and selectively pulse the PW MOTOR DRIVE A signal off and PW MOTOR DRIVE C signal on, or have the PW MOTOR DRIVE A signal on and selectively pulse the PW MOTOR DRIVE B signal off and the PW MOTOR DRIVE signal D on.

A dual coil damping approach for a dual coil or bipolar drive motor of the type above-described, the processor 64 would have the motor drive signal for coil 76(A-C) on and selectively pulse off the motor drive signal for coil 76(B-D), or have the motor drive signal for coil 76(B-D) on and selectively pulse off the motor drive signal for coil 76(A-C). As an alternative, the processor 64 could have the motor drive signal for coil 76(A-C) on and selectively reverse the motor drive signal for coil 76(B-D) in the manner above described, or have the motor drive signal for coil 76(B-D) on and selectively reverse the motor drive signal for coil 76(A-C).

Figure 16:
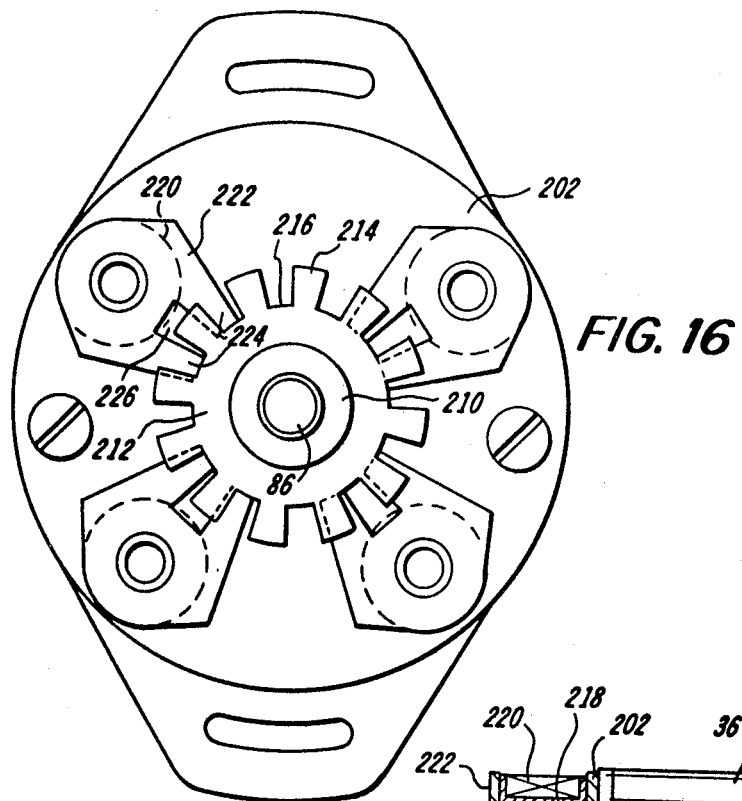
FIG. 16 is a front elevation view of the print wheel motor of FIG. 3 with an alternative print wheel sensor.
Figure 17:
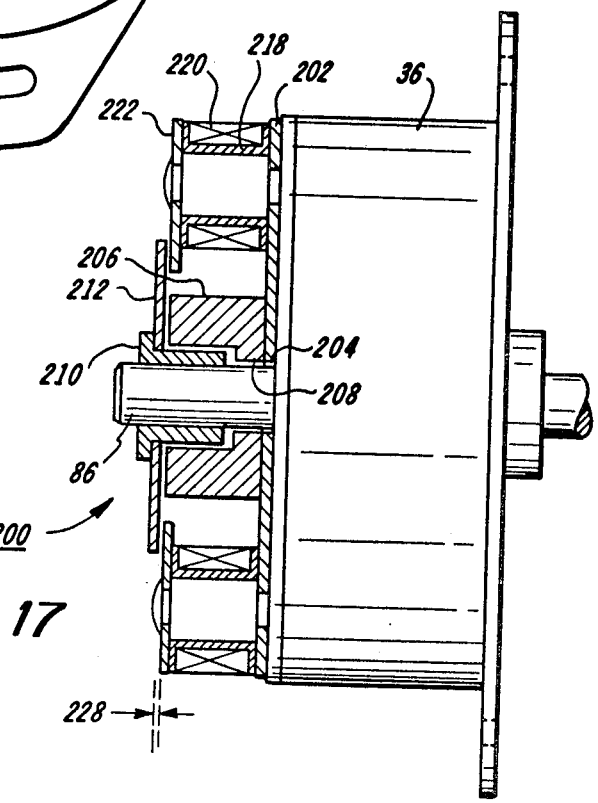
FIG. 17 is a partial cross-sectional view of the print wheel motor and sensor of FIG. 16 taken along line 17—17 of FIG. 16.

Reference is now made to FIGS. 16 and 17 where an alternative print wheel sensor 200 for the print wheel motor 36 will be described. The sensor depicted and to be described can also be used in conjunction with the carriage motor 34.

As shown in FIGS. 16 and 17, the print wheel sensor 200 includes a ferrous mounting plate 202 which may be bolted to the side surface of the print wheel motor 36. The plate 202 has a central opening 204 through which the drive shaft 86 of the motor 36 may project. Affixed to the mounting plate 202 is a cylindrical axially magnetized permanent magnet 206 having a central cylindrical opening 208 through which the shaft 86 may project. Mounted to the drive shaft 86 by means of a hub 210 is a rotor 212 having a plurality of spaced teeth 214 separated by a respective plurality of recesses 216.

The sensor 200 also has four position displaced poles 218, each of which has a coil 220 wrapped thereabout and an outer stator plate 222 which underlies the path of movement of the teeth 214 of the rotor 212, as best shown in FIG. 16. The stator plate 222 itself has a pair of teeth 224 spaced apart by a recess 226. A gap 228 (FIG. 17) of predetermined dimension is defined between the teeth 214 of the rotor 212 and the teeth 224 of the stator plate 222. The sensor 220 is thus referred to as an "axial-gap" sensor, as distinguished from the preferred print wheel sensor 40, which is a "radial-gap" sensor. The output signals from the four coils 220 are substantially the same as those produced from the four coils 102 of the sensors 38 and 40 above-described.

Although the invention has been described with respect to a presently preferred embodiment, it will be appreciated by those skilled in the art that various substitutions, modification, etc., some of which have been discussed above, may be made without departing from the spirit and scope of the invention as defined in and by the following claims. For example, a dual stack motor or two motors on a common shaft (or coupled through a gear assembly) may be used instead of the motor-sensor arrangements thus far described. In these arrangements, one stack of the dual stack motor or one motor of the dual motor set would be used for driving, while the other stack of the dual stack motor or other motor of the dual motor set would be used for sensing through inducing an electromotive force in the coils thereof that varies in proportion to the speed of rotation of the drive shaft. Additionally, the teeth 106 of the rotor 90 may be shaped differently than as depicted in the drawing in a manner to alter the ultimate output waveforms from the coils 102. Still further, it should be clear that any suitable microprogram may be employed for controlling the master processor 62 and slave processor 64 in the manner above-described. Preferably, such programs would be written in code executable by the Intel 8048 and 8041 processors.

What is claimed is:

1. Apparatus for controlling the movement of a movable element to bring said movable element to rest at a desired stopping position, said apparatus comprising:
   a multi-phase drive motor having a drive shaft coupled to said movable element for driving same, four electrically conductive coils mounted in position-displaced relationship about said shaft, and means coupled to said drive shaft and responsive to the selective energization of said coils by respective motor drive signals for causing the corresponding rotation of said drive shaft and movement of said movable element;
   a sensor coupled to said drive shaft and responsive to the rotation thereof for generating an electrical signal containing information indicative of the direction, speed and distance of movement of said movable element;
   means for detecting from the distance information indicated by said electrical signal whether said movable element is within a predetermined distance of said desired stopping position; and
   control means for controlling the levels of said motor drive signals in dependence upon the direction information indicated by said electrical signal following detection of said movable element being within said predetermined distance of said desired stopping position, said motor and thus said movable element being brought to a final stop with only a single one of said motor drive signals and thus corresponding single motor coil on, said control means including means for selectively turning on and off or reversing either the two coils displaced counterclockwise of said single motor coil about said shaft or the two coils displaced clockwise of said single motor coil about said shaft in dependence upon the direction information indicated by said electrical signal.

2. The apparatus of claim 1, wherein said single one motor drive signal and thus corresponding single motor coil is turned on by said control means following detection of said movable element being within said predetermined distance.

3. Apparatus for controlling the movement of a movable element to bring said movable element to rest at a desired stopping position, said apparatus comprising:
a multi-phase drive motor having a drive shaft coupled to said movable element for driving same, four electrically conductive coils mounted in position-displaced relationship about said shaft, and means coupled to said drive shaft and responsive to the selective energization of said coils by respective motor drive signals for causing the corresponding rotation of said drive shaft and movement of said movable element;
a sensor coupled to said drive shaft and responsive to the rotation thereof for generating an electrical signal containing information indicative of the direction, speed and distance of movement of said movable element;
means for detecting from the distance information indicated by said electrical signal whether said movable element is within a predetermined distance of said desired stopping position; and
control means for controlling the levels of said motor drive signals in dependence upon the direction information indicated by said electrical signal following detection of said movable element being within said predetermined distance of said desired stopping position, said motor and thus said movable element being brought to a final stop with two adjacent motor coils turned on by their respective motor drive signals, said control means including means for selectively turning on and off or reversing one of said two adjacent motor coils and a third motor coil adjacent the other of said two adjacent motor coils during movement of said movable element toward said desired stopping position.

4. The apparatus of claim 3, wherein the other of said two adjacent motor coils is turned on by said control means following detection of said movable element being within said predetermined distance.

5. The apparatus of claim 2 or claim 4, wherein said drive motor is a stepper motor.

6. The apparatus of claim 5, wherein said stepper motor is a four-phase motor including said four coils.

7. The apparatus of claim 6, wherein, at a constant velocity of movement of said movable element, said electrical signal is periodic with a peak amplitude and frequency proportional to the velocity of said movable element, has a polarity indicative of the direction of movement of said movable element, and has a period representative of a predetermined increment of movement of said movable element.

8. The apparatus of claim 7, wherein said sensor comprises:
an electrically conductive sensor coil mounted adjacent the drive shaft of said motor;
flux producing means mounted adjacent said sensor coil for producing a path of normally substantially constant magnetic flux adjacent said coil; and
flux varying means coupled to said drive shaft and responsive to the rotation of said drive shaft by said motor for varying the level of said magnetic flux adjacent said coil in dependence upon the direction, speed and distance of rotation of said drive shaft, whereby the resultant electromotive force induced in said sensor coil defines said electrical signal across said sensor coil.

9. The apparatus of claim 8, wherein said sensor comprises at least two sensor coils mounted adjacent the drive shaft of said motor.

10. The apparatus of claim 9, wherein said at least two sensor coils are aligned about said drive shaft with respective ones of said motor coils.

11. The apparatus of claim 10, wherein two of said electrical signals are respectively generated by said at least two sensor coils, said two electrical signals being mutually electrically phase-displaced by 90°.

12. The apparatus of claim 11, wherein said two electrical signals are substantially sinusoidal waveforms.

13. The apparatus of claim 1, further comprising:
means coupled to said sensor coils for generating four square-wave signals; and
means responsive to the levels of said square-wave signals for controlling the levels of said motor drive signals.

* * * * *